United States Patent
Su et al.

(10) Patent No.: US 9,859,706 B2
(45) Date of Patent: Jan. 2, 2018

(54) UNITED POWER MODULE AND SYSTEM USING THE SAME

(71) Applicant: REALTEK SEMICONDUCTOR CORP., Hsinchu (TW)

(72) Inventors: Ching-Yao Su, Taichung (CN); Liang-Wei Huang, Hsinchu (TW); Hsuan-Ting Ho, Taichung (TW); Sheng-Fu Chuang, Taichung (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 228 days.

(21) Appl. No.: 14/865,085

(22) Filed: Sep. 25, 2015

(65) Prior Publication Data

US 2016/0276925 A1     Sep. 22, 2016

(30) Foreign Application Priority Data

Mar. 20, 2015  (TW) .............................. 104108942 A

(51) Int. Cl.
    *H02J 1/14*      (2006.01)
(52) U.S. Cl.
    CPC ..................... *H02J 1/14* (2013.01)
(58) Field of Classification Search
    CPC .......................................................... H02J 1/14
    USPC ........................................ 307/43, 52, 63, 77
    See application file for complete search history.

(56) References Cited

U.S. PATENT DOCUMENTS

| 4,728,807 A * | 3/1988 | Harafuji .................... G05F 1/59 |
| | | 307/48 |
| 2002/0093248 A1* | 7/2002 | Takahashi ............... G06F 1/266 |
| | | 307/43 |
| 2007/0204178 A1* | 8/2007 | Nishigata ................ G06F 1/263 |
| | | 713/300 |

FOREIGN PATENT DOCUMENTS

TW        201023479 A1      6/2010

* cited by examiner

*Primary Examiner* — William Hernandez
(74) *Attorney, Agent, or Firm* — Li&Cai Intellectual Property (USA) Office

(57) ABSTRACT

A united power module having an external input and a first input is provided. The united power module includes a load block, a protection circuitry and a detection block. The detection block includes an analog circuitry. The load block and an end of the protection circuitry are electrically coupled to the external input. The load block, the first input, and another end of the protection circuitry are electrically coupled to the detection block. The load block is supplied by an external power received from the external input. The protection circuitry receives the external power and outputs an auxiliary power. The analog circuitry receives a first power from the first input under a normal power supply state, or receives the auxiliary power under an auxiliary power supply state.

11 Claims, 3 Drawing Sheets

UNITED POWER MODULE AND SYSTEM USING THE SAME

BACKGROUND OF THE INVENTION

1. Field of the Invention

The instant disclosure relates to a power module; in particular, to a united power module and a system thereof.

2. Description of Related Art

In system design of electronic circuits, in order to prevent the original circuit structure from being changed too much, the original chip module is normally electrically coupled to other modules such that the needed functions can be implemented. For example, the Ethernet circuit module and the circuit elements electrically coupled to the circuit module are important for data transmission of communication systems, so different detection circuits receiving different powers are configured to detect the Ethernet circuit module. That is, the detection circuits are configured to detect whether the operation voltage of the Ethernet circuit module is stable, to detect whether the Ethernet circuit module operates normally, and to implement certain controls if necessary.

More precisely, in order not to change the structure of circuit module, additional circuit modules or elements would generally be used to convert different powers into the driving powers which can be received by the detection circuits. However, in practice, if the powers or the additional circuit modules/elements are damaged, the detection circuits are unable to implement the detection because of the unstable driving power. Therefore, the possibility that the detected circuit module works abnormally is further increased.

SUMMARY OF THE INVENTION

In order to solve the above problem, the instant disclosure provides a united power module having an external input and a first input. The united power module includes a load block, an external power, a protection circuitry, and a detection block. The load block is electrically coupled to the external input and driven by receiving an external power through the external input. The protection circuitry has one end electrically coupled to the external input, such that the external power through the protection circuitry is outputted as an auxiliary power. The detection block is electrically coupled to the load block, the first input and another end of the protection circuitry. The detection block includes an analog circuitry. The analog circuitry is configured to receive a first power through the first input in a normal power supply state or to receive the auxiliary power in an auxiliary power supply state for detecting the load block.

In the united power module of the instant disclosure, a first voltage of the first power is greater than an auxiliary voltage of the auxiliary power in the normal power supply state, and the normal power supply state is switched into the auxiliary power supply state when the first voltage is less than the auxiliary voltage.

The instant disclosure further provides a united power system receiving an external power and a main power. The united power system includes a regulator module and a united power module. The regulator module has a main power input and an output. The regulator module receives the main power via the main power input, converts the main power and outputs a first power via the output. The united power module has an external input and a first input configured to respectively receive the external power and the first power. The united power module is electrically coupled to the regulator module. The united power module includes a load block, an external power, a protection circuitry and a detection block. The load block is electrically coupled to the external input and driven by receiving an external power through the external input. The protection circuitry has one end electrically coupled to the external input, such that the external power through the protection circuitry is outputted as an auxiliary power. The detection block is electrically coupled to the load block, the first input and another end of the protection circuitry. The detection block includes an analog circuitry. The analog circuitry is configured to receive a first power through the first input in a normal power supply state or to receive the auxiliary power in an auxiliary power supply state for detecting the load block.

In the united power system of the instant disclosure, a first voltage of the first power is greater than an auxiliary voltage of the auxiliary power in the normal power supply state, and the normal power supply state is switched into the auxiliary power supply state when the first voltage is less than the auxiliary voltage.

To sum up, the united power module and the system thereof provided by the embodiments of the instant disclosure use different input powers to form a united power structure to prevent the traditional situation that the circuit or module receives single input power and works abnormally because the single input power is damaged. It is worth mentioning that the united power module provided by the embodiments of the instant disclosure uses a protection circuitry to make a voltage difference between two input powers so as to prevent a dangerous situation because of the counter current caused when the voltage of one of the input powers is greater than other input powers.

For further understanding of the instant disclosure, reference is made to the following detailed description illustrating the embodiments and examples of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings.

DETAILED DESCRIPTION OF PREFERRED EMBODIMENTS

Figure 1:
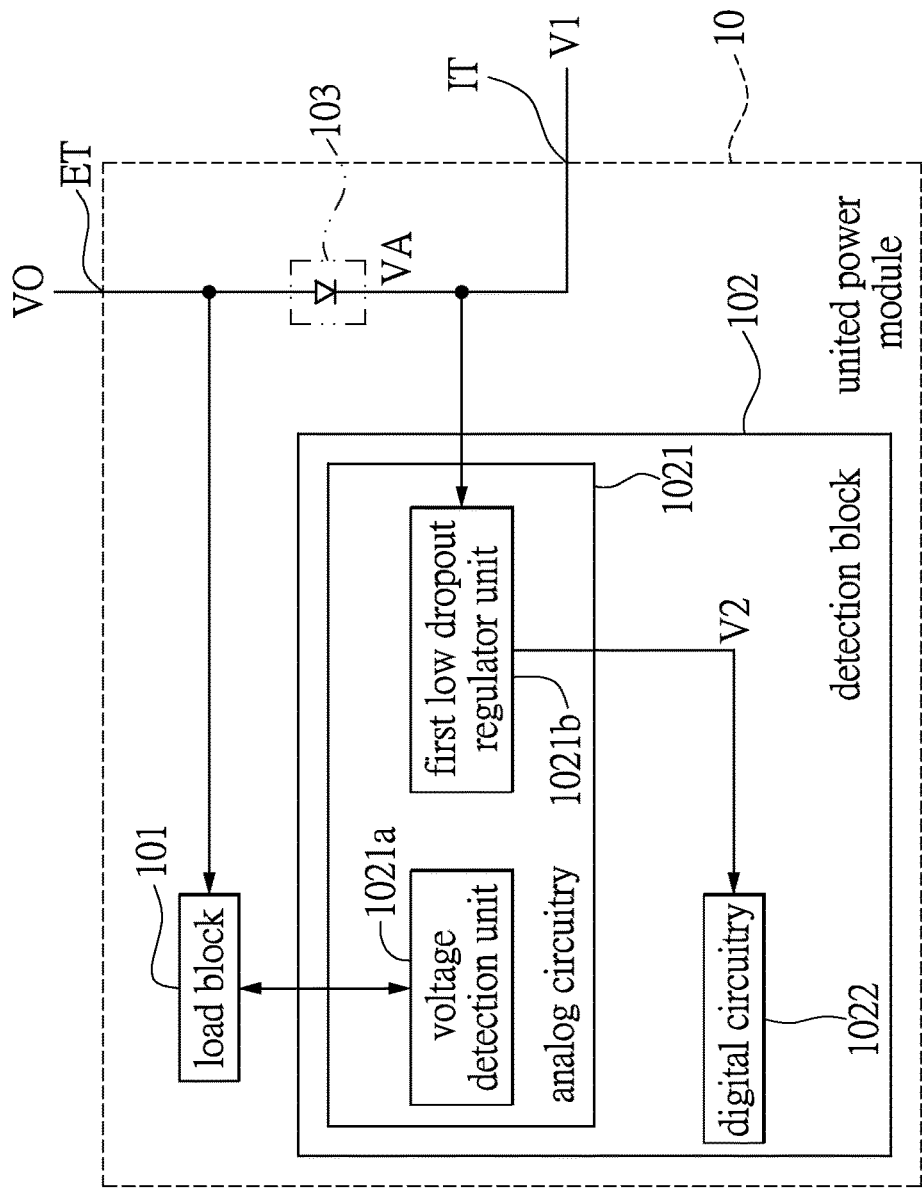
FIG. 1 shows a block diagram of a united power module of one embodiment of the instant disclosure.

The aforementioned illustrations and following detailed descriptions are exemplary for the purpose of further explaining the scope of the instant disclosure. Other objectives and advantages related to the instant disclosure will be illustrated in the subsequent descriptions and appended drawings. In the drawings, the size and relative sizes of layers and regions may be exaggerated for clarity.

It should be understood that, although the terms first, second, third and the like, may be used herein to describe various elements, these elements should not be limited by these terms. These terms are only to distinguish one element from another element discussed below which could be termed a second element without departing from the teachings of the instant disclosure. As used herein, the term "and/or" includes any and all combinations of one or more of the associated listed items.

In an electrical power supply system for vehicles, the voltage of the power supply is usually higher (mostly 12 volts). Thus, to adapt to the traditional Ethernet circuit (such as chips under T65 processing), elements compatible with the vehicle power are needed. The instant disclosure uses multiple input powers and has a protection circuitry configured in the united power module to decrease the possibility that the united power system works abnormally. The following describes embodiments of the united power module and the system thereof provided by the instant disclosure.

Referring to FIG. 1, FIG. 1 shows a block diagram of a united power module of one embodiment of the instant disclosure. The united power module 10 has an external input ET and a first input IT respectively configured to receive an external power VO and a first power V1. The united power module 10 includes a load block 101, a detection block 102 and a protection circuitry 103. The detection block 102 includes an analog circuitry 1021 and a digital circuitry 1022. The analog circuitry 1021 includes a voltage detection unit 1021a and a first low dropout regulator unit (LDO) 1021b. The load block 101 and one end of the protection circuitry 103 are electrically coupled to the external input ET. The detection block 102 is electrically coupled to the load block 101, the first input IT and another end of the protection circuitry 103. More precisely, the voltage detection unit 1021a is electrically coupled to the load block 101, and the first low dropout regulator unit 1021b is electrically coupled to the first input IT, another end of the protection circuitry 103 and the digital circuitry 1022.

In the present embodiment, the voltage of the external power VO is provided as a driving power for the load block 101. More specifically, the external power VO is provided by an indirect conversion from the vehicle power supply or directly by an additional power supplier. Moreover, the voltage of the first power V1 provides a driving power to the detection block 102. The first power V1 is provided by a vehicle power converted via a high voltage element (such as a chip under the T18 processing) or provided directly by an additional power supplier. However, in other embodiments, sources of the external power VO and the first power are not limited herein.

The load block 101 includes suitable circuits, logics and/or codes for receiving the external power VO input from the external input ET to start driving. In the embodiment of the instant disclosure, the load block 101 includes transmission modules in the PHY layer and the MAC layer of Ethernet (such as TX/RX modules) or other function circuits. However, in other embodiments, the load block 101 can also be implemented by general loading circuits, computing circuits or the like.

The detection block 102 is configured as a finite-state machine (FSM) for detecting and storing the information of the operation of the load block 101 in the past, but it is not limited herein. In other words, the detection block 102 shows a system input change from a start timepoint to a current timepoint. More precisely, the detection block 102 starts driving via receiving the first power V1 input from the first input IT or via receiving the auxiliary power VA, so as to detect a working state of the load block 101. The detection block 102 detects whether the voltage of the load block 101 is too low via the voltage detection unit 1021a of the analog circuitry 1021, records the error flag of the load block 101 and even further controls or adjusts the external power VO. On the other hand, the first low dropout regulator unit 1021b of the analog circuitry 1021 is configured to further convert the first power V1 or the auxiliary power VA into the second power V2 that is received by the digital circuit 1022. Under the circumstance that the input voltage or the output current of the first low dropout regulator unit 1021b changes, the first low dropout regulator unit 1021b is configured to regulate the output voltage. In the embodiments of the instant disclosure, the first low dropout regulator unit 1021b is configured to output the second power V2 to the digital circuitry 1022 so as to drive the digital circuitry 1022.

In some embodiments, the external power VO is 3.3 volts (e.g., 3.3 volts converted from 12 volts of vehicle power), the voltage of the first power V1 is 3.3 volts, and the voltage of the second power V2 is 1.2 volts. However, in practice, the voltage values can be determined depending on need, and it is not limited herein.

Afterwards, the protection circuitry 103 receives the external power VO and outputs an auxiliary power VA. In other words, the external power VO flowing through the protection circuitry 103 is output by the protection circuitry 103 and becomes an auxiliary power VA. In the embodiments of the instant disclosure, the protection circuitry 103 is a diode. The anode of the diode is electrically coupled to the external input ET, and the cathode of the diode is electrically coupled to the analog circuitry 1021. When the external input ET is not electrically coupled to a power or is grounded, the protection circuitry 103 prevents the first power V1 from flowing to the external input ET and resulting in a leakage current. In detail, the input external power VO is dropped by the protection circuitry 103 and an auxiliary power VA is output. In the embodiments of the instant disclosure, when the united power module 10 is in the normal power supply state, the first voltage of the first power V1 is greater than the auxiliary voltage of the auxiliary power VA. Thus, the united power module 10 receives a driving power provided by the first power V1 and then provides it to the detection block 102 for operation. However, when the first voltage of the first power V1 is less than the auxiliary voltage of the auxiliary power VA, the united power module 10 turns into the auxiliary power supply state, and provides a driving voltage to the detection block 102 to maintain the operation, wherein the auxiliary power VA is output as the input external power VO is dropped by the protection circuitry 103. In other words, there would be a voltage difference between the auxiliary power VA and the first power V1 (that is, in the normal power supply state, the auxiliary power VA is less than the first power V1, and in the auxiliary power supply state, the auxiliary power VA is greater than the first power V1) such that the detection block 102 would first receive the voltage source having a higher voltage value.

For example, the external power VO of 3.3 volts is as an input voltage source. After the external power VO is dropped by the protection circuitry 103 and a voltage drop of 0.8 volts is generated, an auxiliary power VA of 2.5 volts is output. In addition, the first voltage V1 is 3.3 volts. Thus, when the united power module 10 is in the normal power supply state, the voltage of the first power V1 is greater than the voltage of the auxiliary power VA, and the detection block 102 receives a driving voltage provided by the first power for operation. On the other hand, when the source of the first power V1 is abnormal and the voltage of the first power V1 is not stable (for example), the united power module 10 turns into the auxiliary power supply state and the auxiliary power VA of 2.5 volts is provided as a driving power to the detection block 102 for maintaining the operation of the detection block 102. It is worth mentioning that, the protection circuitry 103 may be a diode generating a voltage drop of 0.3-0.8 volts, and there would be a voltage difference between the auxiliary power VA and the first power V1, such that the voltage source having a higher voltage value would first be the power supply. Also, when one of voltage sources is not stable and the voltage thereof is lower than the voltage of another voltage source, another voltage source is provided to supply power to prevent two voltage sources from consuming power at the same time.

As mentioned above, the united power module 10 provided by the embodiment of the instant disclosure uses different input power to form a united power structure in order to prevent the detection block 102 from the abnormal circumstances, in which the abnormal circumstances is caused by the single input power that is unstable.

Figure 2:
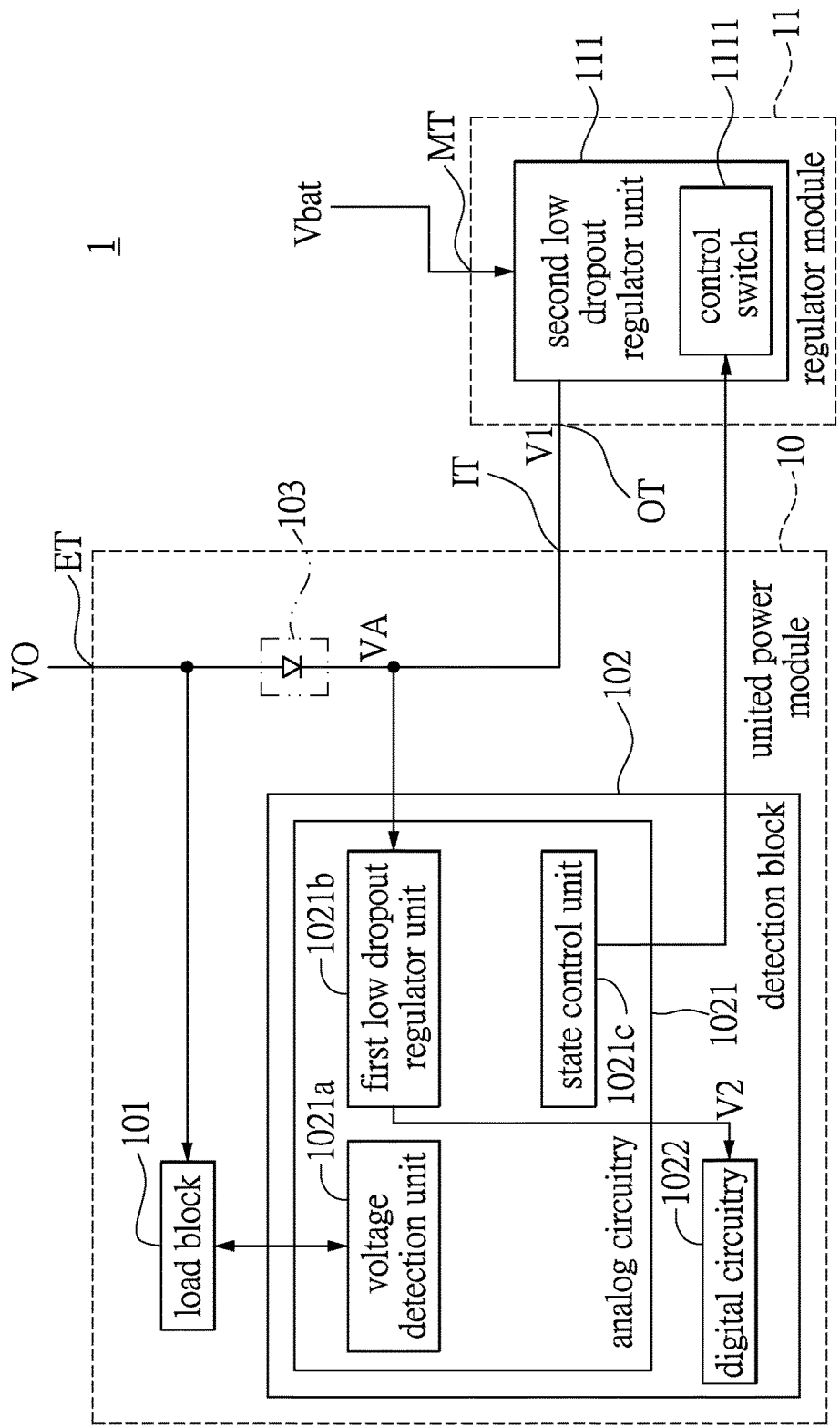
FIG. 2 shows a block diagram of a united power system of one embodiment of the instant disclosure.

The following describes the application of the united power module 10. Referring to FIG. 2, FIG. 2 shows a block diagram of a united power system of one embodiment of the instant disclosure. In the embodiment of the instant disclosure, the united power module 10 in FIG. 2 and the united power module 10 in FIG. 1 are almost the same, and the only difference is that the analog circuitry 1021 of the united power module 10 in FIG. 2 further includes a state control unit 1021c.

The united power system 1 includes a united power module 10 and a regulator module 11. The regulator module 11 includes a main power input MT receiving the main power Vbat and an output OT outputting a first power V1, wherein the output is electrically coupled to a first input IT of the united power module 10. The regulator module 11 includes a second low dropout regulator unit 111, and the second low dropout regulator unit 111 includes a control switch 1111.

More precisely, the regulator module 11 receives the main power Vbat via the main power input MT, converts the main power Vbat and outputs the first power V1 via the output OT. In the embodiments of the instant disclosure, the main power is a vehicle power of 12 volts. The regulator module 11 converts the vehicle power into the first power via the second low dropout regulator unit 111, and outputs the first power V1 via the output OT for providing the first power V1 to the united power module 10.

In the embodiments of the instant disclosure, the analog circuitry 1021 of the united power module 10 further includes a state control unit 1021c electrically coupled to the control switch 1111 for outputting a mode signal to the regulator module 11, so that the regulator module 11 is switched to a low power control mode or a high power control mode so as to provide a power saving function of the united power system 1. For example, if the detection block 102 is a finite-state machine, when the finite-state machine needs to turn on all or most of the registers (such as programmable logic controllers, logic gates, flip-flops or the like) to store the state variables, the state control unit 1021c outputs a mode signal to the regulator module 11 for switching to the heavy loading mode. On the other hand, when the finite-state machine does not need to turn on all or most of the registers to store the state variables, the state control unit 1021c outputs a mode signal to the regulator module 11 for switching to the light loading mode.

More specifically, when the second low dropout regulator unit 111 of the regulator module 11 receives the mode signal output by the state control unit 1021c to switch into the light loading mode, part of internal circuit of the second low dropout regulator unit 111 is turned off via the control switch 1111 so as to decrease the power consumption of the second low dropout regulator unit 111 and to further decrease the maximum output current of the first power V1. When the second low dropout regulator unit 111 of the regulator module 11 receives the mode signal output by the state control unit 1021c to switch into the heavy loading mode, the internal circuit of the second low dropout regulator unit 111 is entirely turned on via the control switch 1111 so as to increase the power consumption of the second low dropout regulator unit 111 and to further increase the maximum output current of the first power vl.

In other words, when receiving the mode signal output by the state control unit 1021c of the analog circuitry 1021, the second low dropout regulator unit 111 switches the regulator module 11 into the light loading mode via the control switch 1111 so as to output the first power V1 having a first current or switches the regulator module 11 into the heavy loading mode via the control switch 1111 so as to output the first power V1 having a second current, wherein the second current is greater than the first current.

It should be mentioned that, only two voltage sources are used for illustrating the embodiments of the instant disclosure, but those skilled in the art understand that three or more voltage sources with the protection circuitries 103 having different voltage drops can also implement a united power system. Thus, the number of the voltage sources and the number of the protection circuitries 103 are not limited herein.

Figure 3:
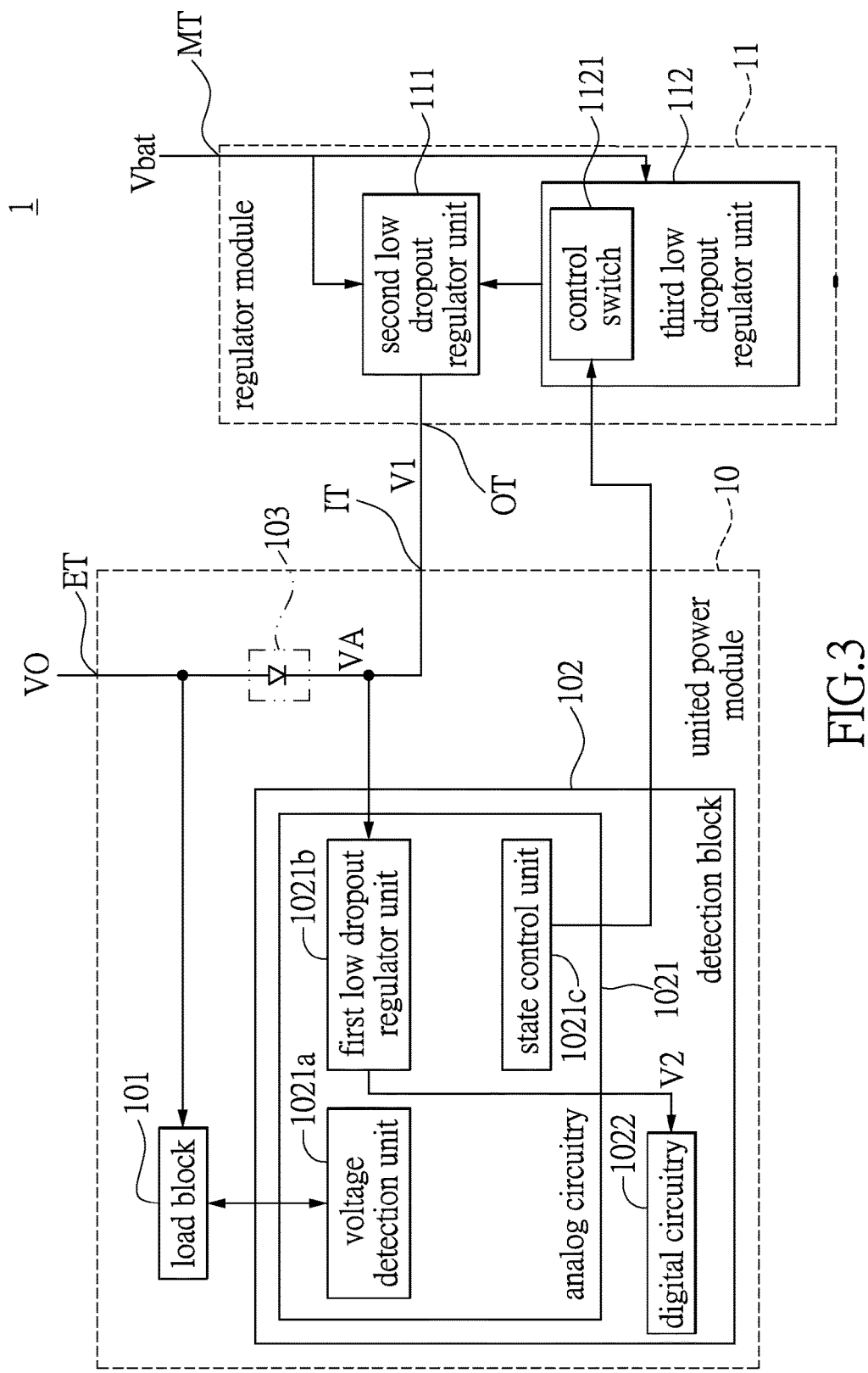
FIG. 3 shows a block diagram of a united power system of another embodiment of the instant disclosure.

Referring to FIG. 3, FIG. 3 shows a block diagram of a united power system of another embodiment of the instant disclosure. The difference between the embodiments shown in FIG. 3 and FIG. 2 is that the regulator module 11 in FIG. 3 further includes a third low dropout regulator unit 112, and that the third low dropout regulator unit 112 has a control switch 1121. In the embodiments of the instant disclosure, the second low dropout regulator unit 111 does not have a control switch, and the third low dropout regulator unit 112 is electrically coupled to the second low dropout regulator unit 111. When the third low dropout regulator unit 112 of the regulator module 11 receives the mode signal output by the state control unit 1021c to switch into the light loading mode, the third low dropout regulator unit 112 is turned off via the control switch 1121. Thus, the regulator module 11 merely outputs the first power V1 having a first current via the second low dropout regulator unit 111. If the third low dropout regulator unit 112 of the regulator module 11 receives the mode signal output by the state control unit 1021c to switch into the heavy loading mode, the third low dropout regulator unit 112 is turned on via the control switch 1121. Thus, the regulator module 11, via the third low dropout regulator unit 112, assists the second low dropout regulator unit 111 to output the first power Vl providing the second current. Also, the second current is greater than the first current.

In short, in the embodiments of the instant disclosure, the mode of the regulator module 11 is switched by a mode signal sent based on the needs for the operation of the state control unit 1021c, so as to save power for the entire united power system 1. It is worth mentioning that there are only one or two low dropout regulator units 111 and 112 in the description for illustrating the embodiments of the instant disclosure, but those skilled in the art should also understand that three or more second and third low dropout regulator units 111 and 112 with the control switch 1121 inside can implement more than three current modes to reach the power saving effects in different scales. Thus, the number of the second low dropout regulator units 111, the number of the third low dropout regulator units 112 and the number of the control switches 1121 are not limited herein.

To sum up, the united power module and the system thereof provided by the embodiments of the instant disclosure use different input powers to form a united power structure to prevent the traditional situation that the circuit or module receives single input power and works abnormally because the input power is damaged. It is worth mentioning that, the united power module provided by the embodiments of the instant disclosure uses a protection circuitry to make a voltage difference between two input powers so as to prevent consuming power of two input powers simultaneously. Further, when the voltage of one of the input powers is greater than the voltage of the other input powers, the protection circuitry can prevent a counter current that may cause a danger.

On the other hand, in the united power system provided by the embodiments of the instant disclosure, there is a state control unit configured in the main powered united power module to further control the output power of the regulator module. In other words, the current of the output power of the regulator module is adjusted according to the power consumption of the inner circuit of the united power module for saving power.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A united power module, having an external input and a first input, comprising:
   a load block, electrically coupled to the external input and driven by receiving an external power through the external input;
   a protection circuitry, wherein one end of the protection circuitry is electrically coupled to the external input, such that the external power through the protection circuitry is outputted as an auxiliary power; and
   a detection block, electrically coupled to the load block, the first input and another end of the protection circuitry, comprising:
      an analog circuitry, configured to receive a first power through the first input in a normal power supply state or to receive the auxiliary power in an auxiliary power supply state for detecting the load block.

2. The united power module according to claim 1, wherein a first voltage of the first power is greater than an auxiliary voltage of the auxiliary power in the normal power supply state, and the normal power supply state is switched into the auxiliary power supply state when the first voltage is less than the auxiliary voltage.

3. The united power module according to claim 1, wherein the protection circuitry is a diode, an anode of the diode is electrically coupled to the external input, and a cathode of the diode is electrically coupled to the analog circuitry.

4. The united power module according to claim 1, wherein the analog circuitry comprises:
   a voltage detection unit, electrically coupled to the load block, and configured to detect and record an error flag of the load block; and
   a low dropout regulator unit, electrically coupled to the first input and another end of the protection circuitry, and configured to convert the received first power or the auxiliary power into a second power having a second voltage, wherein the second voltage is configured to drive a digital circuitry.

5. A united power system, receiving an external power and a main power, the united power system comprising:
   a regulator module, having a main power input and an output, wherein the regulator module receives the main power via the main power input, converts the main power, and outputs a first power via the output; and
   a united power module, having an external input and a first input configured to respectively receive the external power and the first power, wherein the united power module is electrically coupled to the regulator module, and the united power module comprises:
      a load block, electrically coupled to the external input and driven by receiving an external power through the external input;
      a protection circuitry, wherein one end of the protection circuitry is electrically coupled to the external input, such that the external power through the protection circuitry is outputted as an auxiliary power; and
      a detection block, electrically coupled to the load block, the first input and another end of the protection circuitry, comprising:
         an analog circuitry, configured to receive a first power through the first input in a normal power supply state or to receive the auxiliary power in an auxiliary power supply state for detecting the load block.

6. The united power system according to claim 5, wherein a first voltage of the first power is greater than an auxiliary voltage of the auxiliary power in the normal power supply state, and the normal power supply state is switched into the auxiliary power supply state when the first voltage is less than the auxiliary voltage.

7. The united power system according to claim 5, wherein the protection circuitry is a diode, an anode of the diode is electrically coupled to the external input, and a cathode of the diode is electrically coupled to the analog circuitry.

8. The united power system according to claim 5, wherein the analog circuitry comprises:
   a voltage detection unit, electrically coupled to the load block, and configured to detect and record an error flag of the load block; and
   a low dropout regulator unit, electrically coupled to the first input and another end of the protection circuitry, and configured to convert the received first power or the auxiliary power into a second power having a second voltage, wherein the second voltage is configured to drive a digital circuitry.

9. The united power system according to claim 5, wherein the analog circuitry further comprises:
   a state control unit, configured to output a mode signal to the regulator module such that the regulator module is switched to a light loading mode or a heavy loading mode.

10. The united power system according to claim 9, wherein the regulator module further comprises:
    a second low dropout regulator unit, having a control switch, wherein as the control switch receives the mode signal outputted by the state control unit, the control switch is configured to switch the regulator module to the light loading mode for outputting a first current or to the heavy loading mode for outputting a second current, in which the second current is greater than the first current.

11. The united power system according to claim 9, wherein the regulator module further comprises:
    a second low dropout regulator unit, configured to output a first current in the light loading mode and to output a second current in the heavy loading mode;

a third low dropout regulator unit, electrically coupled to the second low dropout regulator unit, comprising:
a control switch, wherein as the control switch receives the mode signal output by the state control unit, the control switch is configured to turn on the third low dropout regulator unit for assisting the second low dropout regulator unit to output the second current in the heavy loading mode, in which the second current is greater than the first current.

\* \* \* \* \*